United States Patent Office 3,408,204
Patented Oct. 29, 1968

3,408,204
FLOUR AGGREGATION PROCESS
Arthur M. Swanson, Madison, and Douglas J. Fenske, Tomah, Wis., assignors, by mesne assignments, to Arthur M. Swanson, Madison, Wis.
Filed Dec. 21, 1964, Ser. No. 420,078
4 Claims. (Cl. 99—93)

ABSTRACT OF THE DISCLOSURE

A process for aggregating finely divided flour particles including the steps of predrying the particles to a total moisture level substantially below the equilibrium moisture content of the flour for a given relative humidity and temperature without otherwise changing the nature of the constituents of the flour particles, subjecting the particles to an atmosphere of said given relative humidity and temperature to cause moisture to be diffused onto the particles to make their surfaces sticky and self-adhering, and causing said particles to collide randomly to adhere together in the form of aggregates having the same flavor and baking characteristics as the original flour particles. The aggregates may be subjected to final drying to a desired moisture level.

---

This invention relates to the aggregation of finely divided particles, and more particularly to the aggregation of finely divided flour particles.

Most commercial flour products available today are in the form of relatively small particulate particles. The problems involved in wetting and dissolving such flour products are well known. When mixed with water or other liquids, the flour particles tend to form lumps of incompletely wetted product which are very difficult to disperse. This characteristic results in a great deal of time and effort being required on the part of both industry and individual housewives to achieve satisfactory dispersion and dissolving of such flour particles.

It is well known that when certain finely divided dried particles are aggregated, the wettability and dispersibility of such materials in liquids is greatly increased. An example of such an aggregated product is the product commonly known as instant nonfat dried milk.

"Aggregation" means the adhesion of small particulate solids into fairly open and porous clusters or aggregates. Aggregation is accomplished by wetting the surface of each individual particle which causes a momentary surface tackiness. When these individual particles collide, they form random shaped clusters or "aggregates" which may contain a large number of individual particles. The porous, open structure and increased particle size are the characteristics which are responsible for the increased flowability, wettability, and dispersibility of the aggregated products in liquids.

Certain typical processes of aggregation take advantage of the fact that when particulate solids at normal commercial moisture levels are subjected to an atmosphere of air and water vapor, the water vapor is transferred from the wetting atmosphere to the particulate solid. This process of transferring water vapor from the air, or gas phase, to the particulate solids, or solid phase, is a "diffusional" operation, which differs substantially from wetting processes wherein a desired amount of liquid is sprayed or otherwise applied directly onto the particulate solids. Diffusion may therefore be defined as a movement of transfer of a constituent between phases.

In a typical process of aggregation, the particulate solids are injected into a stream of warm, moist air, causing moisture to be diffused from the moist air to the solid. This moisture then causes a momentary surface tackiness which makes the particles self-adhering. The air stream has sufficient turbulence to promote random collisions between particles. The surface tackiness causes the particles to adhere together upon collision to result in the formation of open and porous aggregates. The aggregated structure is retained when the aggregates are subjected to drying conditions to reduce the moisture content to its original level. However, such aggregation processes have been limited to the aggregation of dried particulate commercial products which will develop sufficient tackiness when dispersed in warm, moist air to stick together upon colliding after wetting, and which will remain stuck together after being dried by warm dry air.

Previous efforts to aggregate commercial flour particles according to known processes of the type described above have not produced satisfactory results. Such particles have typically not developed sufficient tackiness when dispersed in warm, moist air to become self-adhering to any substantial extent. As a result, the degree of aggregation achieved when such processes have been employed with flour has been relatively slight.

Attempts to aggregate flour particles through use of other techniques have been only partially successful. In a process different from the water vapor sorption or diffusion process described above, flour has been aggregated by spraying liquid directly onto the surface of the flour particles to make the particles self-adhering upon contact. However, such a process requires an excessive amount of liquid to be added to the dry flour particles to effect the necessary tacky surface condition, in some cases increasing the total moisture content of the flour to between 20% and 50% by weight. Such high moisture conditions may often tend to partially convert the flour particles to a paste or dough stage, with the result that the product may lose some of its flour characteristics on redrying. In one such process, the aggregates so formed are characterized by the formation of dough-balls when the aggregated product is added to water. Such dough-balls are very hard aggregates which fail to break apart when added to a suitable liquid.

In an earlier co-pending application, S.N. 190,637 (now abandoned), the applicants describe a still different process for aggregating flour and other difficult to aggregate materials. The process described in our earlier application consists of mixing a quantity of easily aggregated particulate material such as amorphous lactose with the flour prior to aggregation. During aggregation, the lactose particles form tacky nuclei, in the presence of a warm, moist atmosphere, to which the flour particles adhere on collision to form aggregates. Such a process has the advantage of employing relatively low moisture addition. However, that process cannot be utilized in the great majority of cases where the flour must retain its original composition.

By practicing the methods set forth in this application, it is possible to aggregate commercial flour particles to form improved products exhibiting materially increased flowability, wettability and dispersibility, and without changing the composition of the flour.

Accordingly, it is a primary object of the present invention to provide a process for economically aggregating flour products.

It is a further object of the present invention to provide a process for aggregating flour products without changing their basic composition.

It is a still further object of the present invention to provide a process for aggregating flour products which can be carried out with existing conventional aggregating equipment with the addition of predrying equipment.

It is an additional object of the present invention to provide an aggregated flour product which is free flowing, and readily wettable and dispersible in liquid.

Other objects and advantages will be readily apparent from the following detailed description taken in conjunction with the accompanying drawings:

In general, the present invention is based upon our discovery that the poor aggregating characteristics of most commercially available flour, when subjected to aggregating processes employing diffusional wetting, is due to the fact that the flour particles will not pick up enough moisture from the warm, moist wetting atmosphere to achieve the required degree of surface tackiness. Further, we have found that flour particles will develop momentary surface tackiness sufficient to become self-adhering if enough moisture can be transferred to the surface of the particles. However, even though known diffusional aggregating processes are practiced to employ the highest wetting humidities possible without completely fouling the apparatus being used, most commercial flour particles will not gain enough moisture in such apparatus to achieve effective aggregation. It was therefore necessary to develop the present process whereby commercial flour products may be effectively aggregated by diffusional wetting.

Figure 1:
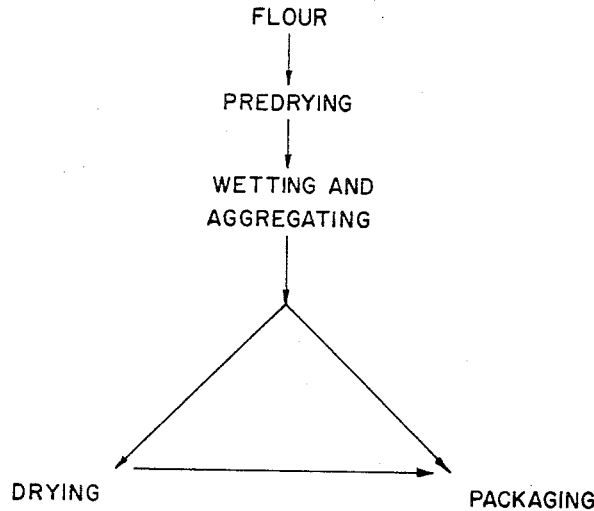
FIG. 1 is a flow diagram indicating a general procedure for carrying out our process.

Broadly stated, our new flour aggregating process involves the preliminary step of adjusting the total moisture content of the initial dried, particulate commercial flour product to a level such that the product particles will absorb sufficient moisture when subjected to diffusional wetting to be self-adherent and achieve the desired degree of aggregation. As shown in the flow diagram of FIG. 1, the preliminary moisture adjusting step normally involves predrying the flour particles to reduce their moisture content to the desired low level. The flour particles are then subjected to a warm, moist atmosphere wherein moisture will be diffused to the surfaces of the particles to effect surface tackiness. The self-adhering particles are then caused to collide randomly to form aggregates. The aggregates may then be dried to a desired final moisture, or may be used directly without drying. Because the flour is pre-dried to a moisture level substantially lower than its normal moisture level, the moisture level of the flour after wetting may be no higher than the normal moisture level of the flour. Further, the surfaces of the wetted particles quickly lose their tackiness as the moisture diffused thereto is sorbed into the aggregated particles. Therefore, final drying of the aggregated product is often unnecessary.

The improved aggregated flour product produced by the process set forth herein exhibits properties markedly different from flour products which are not so treated. The improved properties produced in the aggregated product are those of increased particle size, improved flowability, wettability and dispersibility, and prevention of caking.

In order to better understand the underlying theory of the present invention, which will be set forth in more detail as the description progresses, a discussion of the principles of diffusional wetting is in order.

In order for a powder to be aggregated, it must exhibit certain properties, as previously mentioned. The first, and most important property, is the property of readily sorbing moisture, or hydroscopicity. The sorption of water vapor is necessary to obtain a state of surface tackiness which will allow the powder particles to be randomly adhered to each other.

When a solid particle gains moisture as it does during the aggregation process, two basic and simultaneous phenomena occur: (1) transfer of moisture from the wetting medium or gas phase to the particle or solid phase, and (2) transfer of heat from the wetting medium to the solid phase. Factors governing each of these processes determine the rate and magnitude of moisture gained during the wetting operation of the aggregating process.

In order to know how a solid gains moisture, two separate items must be studied: (1) the properties of the wetting medium or gas phase, and (2) the properties of the solid. The properties of the wetting medium under consideration are exposure time, humidity, and temperature. These properties can be controlled within certain limits by the proper manipulation of the processing equipment. The properties of the solid are a function of its composition and physical-chemical properties, and are not quite so easily controlled. The properties of the solid can be altered by the admixture of some other material as described in our earlier co-pending application S.N. 190,637. However, such alterations are unacceptable where the solid must retain its original composition.

In most diffusional operations, two insoluble phases are brought together to permit the diffusion of substances between them. In the case of aggregation where a water vapor-air mixture is employed as the wetting medium, the powder is referred to as the solid phase, the air is referred to as the gas phase, and the water is the constituent which is diffusing between the two phases. It can be shown that the rate at which a diffusing substance is transferred or diffused from one phase to another is dependent upon the concentration gradient of the diffusing substance existing in each phase. At the same time the concentration gradients are a measure of the departure from equilibrium which exists between the two phases.

In a diffusing operation, "equilibrium" is attained when there is no further transfer of water vapor between the solid phase and the gas phase. Equilibrium can be visualized by considering the following example. Let us take a lever arm, supported at the center by a fulcrum. When this arm is at rest, or equilibrium, it will lie in a perfectly horizontal position. Suppose a weight is then added to one end of the lever arm; the weight will cause an imbalance, or a displacement from equilibrium. In order to bring the lever arm back to a perfectly horizontal position, we must equilibrate the weight distribution by either removing the added weight, or adding another weight to the opposite end of the arm thereby causing equilibrium to be regained. We can now use this analogy to present the attainment of equilibrium between air-water vapor and particulate solids combinations. In this case we will visualize the same lever arm, supported by a fulcrum. At one end of the arm we have a mass of air containing a certain amount of water vapor. The water vapor present in the air will exert a certain pressure, commonly referred to as vapor pressure and symbolized with a $p^o$. The vapor pressure exerted by this water is a direct function of the amount of water vapor present in the air. Now at the other end of the arm we shall place a mass of particulate solid which also contains a certain amount of water. The water present in the solid exerts a vapor pressure $p^s$. As in the case of the above mentioned example, equilibrium will be attained when the two vapor pressures are equal or when $p^o = p^s$. This time instead of adding weights until equilibrium is attained, we will allow the water vapor to diffuse, or travel from one end of the arm to the other until equilibrium is established. Now in the case of aggregation, we will wish to have the water vapor diffuse from the gas phase to the solid phase, so we will set the water vapor content of the mass of air so that the vapor pressure $p^o$ of the air is greater than the vapor pressure $p^s$ of the solid, thus assuring us that water vapor will travel from the gas phase to the solid phase in order to attain equilibrium. The vapor pressures may be used as a measurement of the concentration of water in each phase. Thus we can say that when there is a difference in vapor pressures, a concentration gradient exists between the two phases. When equilibrium is established, the concentration gradient and therefore the rate of diffusion falls to zero.

Let us now consider the establishment of equilibrium data. Suppose a fixed amount of particulate solid is placed in a closed container arranged so that an atmosphere of constant composition can be maintained above it. For example, a sample of wheat flour is exposed to an atmosphere of air and water vapor which is maintained at a high enough vapor pressure to assure transfer of water from the air or gas phase to the flour or solid phase. In this case, the molecules of water will instantly start to diffuse to the solid because of the concentration gradient which exists between them. The water will continue to diffuse to the solid phase until the concentration of water therein is high enough to exert a vapor pressure equal to that exerted by the water vapor present in the gas phase. At this point the concentration gradient between the phases no longer exists, and the rate of diffusion will therefore fall to zero indicating equilibrium conditions have been attained.

Figure 2:
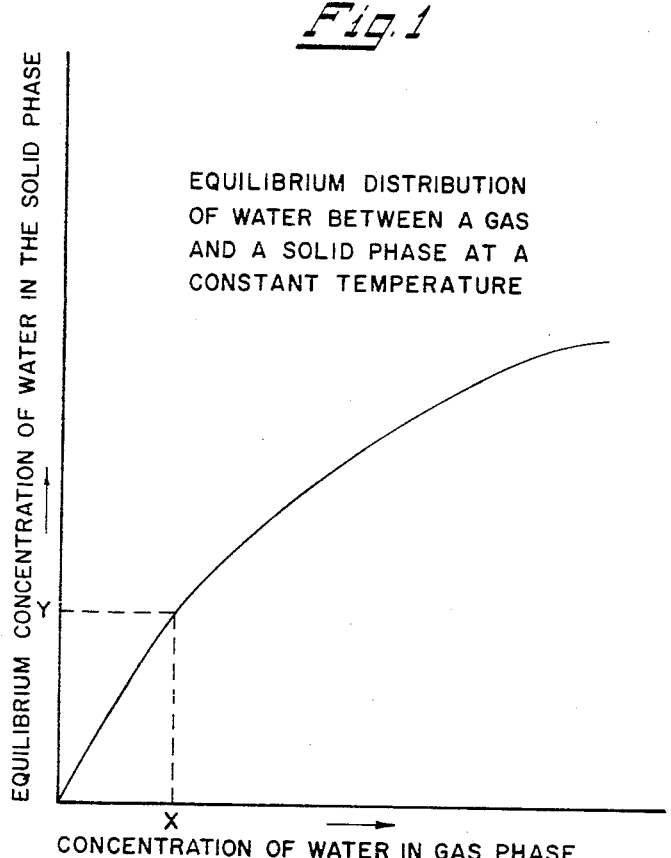
FIG. 2 is a graph illustrating the equilibrium distribution of water between a gas and a solid phase at a constant temperature.

FIG. 2 is illustrative of the type of curve which may be plotted using data obtained when a series of equilibrium sorption studies are carried out at various humidities and constant temperature. At any one given relative humidity X, a sample of particulate solid will sorb a certain quantity of water vapor Y from the air, no more, no less. This amount of water vapor is called the equilibrium moisture content. In FIG. 2 it is referred to as the Equilibrium Concentration of Water in the Solid Phase. Of course when one carries out equilibrium determinations at different temperatures, a whole family of curves can be developed. Whenever a substance is distributed between two phases, an equilibrium relation of this type can be developed. It must be emphasized at this point that the various equilibria are peculiar to the particular material involved.

Figure 3:
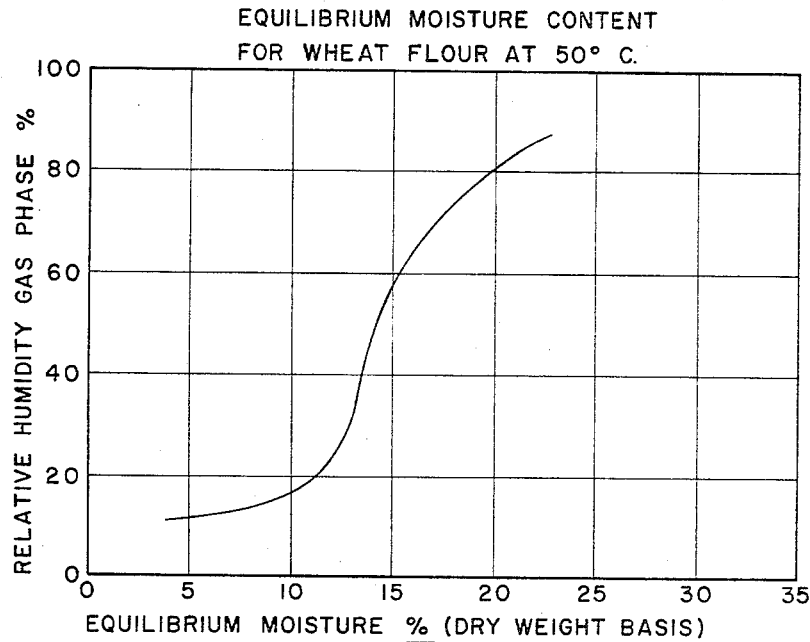
FIG. 3 is a graph illustrating the equilibrium moisture curve for wheat flour at 50° C.
Figure 4:
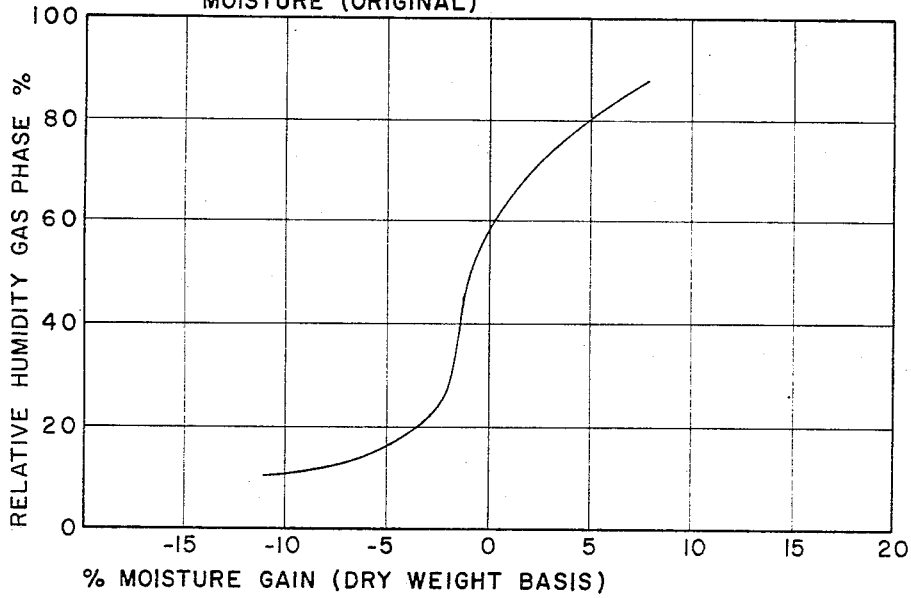
FIG. 4 is a graph showing the percent moisture gain for wheat flour from an original moisture content to equilibrium moisture content at various water vapor concentrations.

Application of the above-discussed principles to flour products is quite revealing. FIG. 3 shows equilibrium data for a sample of wheat flour collected at various relative humidities (a measure of concentration or vapor pressure) in the gas phase. FIG. 3 shows that at 50° C. (122° F.) and a relative humidity of the ambient air of 48%, the equilibrium moisture content of the wheat flour was approximately 14% on a dry weight basis (D.W.B.). Thus, if such wheat flour having a moisture content of about 14% (a typical value for commercial wheat flour) is exposed to relative humidities of less than 48% at a temperature of 50° C., it will actually lose rather than gain moisture. It may also be stated that the "equilibrium humidity" (that relative humidity at which a solid having a given total moisture content will neither gain nor lose in net total moisture) of such a wheat flour having a total moisture content of 14% (D.W.B.) is 48% at a temperature of 50° C. This is best illustrated by the curve of FIG. 4, wherein the relative humidity of the gas phase has been cross-plotted against the percent moisture gain or loss which results when such wheat flour is exposed to various relative humidities under conditions of constant temperature. At approximately 48% relative humidity, the wheat flour will show substantially no net gain or loss of moisture. At a relative humidity of 16%, the wheat flour will experience a loss in total moisture of about 5%. At a relative humidity of approximately 80%, the wheat flour will experience a gain in total moisture of about 5%.

The difficulties encountered in prior attempts to aggregate flour products by means of diffusional wetting processes can now be understood. Most existing diffusional wetting aggregating equipment cannot be operated at relative humidities much in excess of 50% without plugging up or otherwise malfunctioning. This places a severe limitation on the ability of the equipment to aggregate flour products. For the wheat flour described above having an initial moisture content of 14%, the concentration gradient which can be achieved between the wetting medium of the aggregator and the wheat flour is almost non-existent, and there will be little, if any, diffusion of moisture from the wetting medium to the powder during the wetting process. There being no substantial moisture diffusion, the flour particles will not acquire the surface tackiness required for aggregation, and no substantial aggregation will occur. Thus it is seen that the failure of the flour to aggregate is not due to the fact that flour does not become tacky and self-adhering when wetted, but rather to the fact that flour has such a high equilibrium moisture content that it has been impossible to achieve substantial moisture transfer or diffusion to the flour particles with existing diffusion-wetting processes and apparatus. Further, it is seen from FIG. 4 that in order to diffuse enough moisture onto the surface of the wheat flour particles to effect a moisture gain of only 2%, the very minimum amount of moisture gain necessary to promote aggregation, the wheat flour must be subjected to relative humidities in excess of about 60%. And to achieve a total moisture gain of 5% or more, the most effective aggregating range, relative humidities of about 80% or more would be required.

Our novel process avoids the inherent relative humidity limitations of existing diffusion-wetting aggregating apparatus and techniques by predrying the flour product to be aggregated to a level sufficiently low to effect a substantial moisture gain when the predried flour is subjected to relative humidities in a range operably maintainable by existing aggregating equipment at preferred wetting temperatures in excess of about 115° F. By such means, sufficient moisture can easily be diffused onto the surfaces of the flour particles to cause the required momentary tackiness essential to effective aggregation. Referring to our previous lever arm analogy, it may be said that the water vapor is caused to diffuse from the gas phase end of the arm to the solid phase, *not* by increasing the vapor pressure $p^o$ (or relative humidity) in the gas phase, a practical impossibility with existing equipment, but rather by decreasing the vapor pressure $p^s$ in the solid phase.

An example of the use of our new method will be helpful: Wheat flour having a total moisture content of approximately 15% (D.W.B.) and an equilibrium humidity of about 48% at 25° C. was predried to a total moisture content of 8% (D.W.B.) and an equilibrium humidity of about 12%. The predried wheat flour was then injected into a stream of warm air having a relative humidity of approximately 45%, causing water vapor to be diffused from the air to the surface of the flour particles to increase the total moisture of the flour particles by about 6.5%, which is enough to cause momentary surface tackiness. The air stream had sufficient turbulence to cause random collisions betwen the tacky, self-adherent paritcles to produce aggregates. The final product had a total moisture content of about 14.5%. Except for its aggregate structure and greatly improved flowability, wettability and dispersibility, it was unchanged from the original flour product.

It is noteworthy that predrying the flour to a desired low level, and adjusting the relative humidity of the wetting medium, the final moisture will be such that final drying is unnecessary. Thus, no more operations may be necessary to practice our new aggregating process including a predrying step than are required to practice prior typical aggregating processes requiring final drying, even though substantially the same amount or more of moisture may be added during the wetting step of our process. The final product of our process will be no more sticky than the original product after the surface moisture which produces the required momentary surface tackiness is absorbed into the particles. If the aggregates produced by our process have a higher total moisture content than desired, the aggregated product may be redried to any desired moisture level. However, it is usually not practical to dry products such as flour, which have a relatively high equilibrium moisture content at common atmospheric temperatures and relative humidities and which may be maintained at such moisture levels without ill effects, to a level appreciably below such equilibrium moisture contents, since they will quickly regain such removed moisture upon contact with the atmosphere.

Our predrying operation yields a powdered material which will rapidly sorb the amount of water required to promote efficient aggregation. The amount of water vapor transfer can be controlled by adjusting the moisture content of the predried material. This is normally accomplished by controlling the predrying temperatures and exposure times.

Flour products which exhibit high equilibrium moisture curves can now be aggregated without the need of operating aggregators at humidities so high as to cause plugging or fouling problems. The method disclosed in this invention also eliminates the need of altering the physical-chemical properties of the dried particulate solids by the addition of an aggregating aid such as amorphous lactose. Further, the need for spraying moisture directly onto the powder to be aggregated (a proces which might be characterized by the word "soaking," and which differs substantially from our diffusion-wetting process) is eliminated. The total moisture content of the wetted particles in our process never exceeds the equilibrium moisture content for the particular relative humidity and temperature which exist in the wetting section of the apparatus employed. The final product is comprised of aggregates which wet and disperse readily in liquid.

While we have limited the specific examples given herein to the aggregation of wheat flour, the principles of our invention are equally applicable to all flour products, and the claims included herein are not so limited. It is further understood that the present invention is not limited to the particular examples and embodiments of the process and product herein described, but embraces all such modified forms thereof as may come within the scope of the following claims.

We claim:

1. A process for aggregating finely divided dried flour particles comprising the steps of:
  (a) predrying said flour particles without otherwise changing the nature of their constituents to reduce their total moisture to a level substantially below the equlibrium moisture content of said particles for a given relative humidity and temperature,
  (b) subjecting said predried particles to an atmosphere having said given relative humidity and temperature thereby to cause moisture to be diffused from said atmosphere to said particles in an amount sufficient to wet said particles and cause the surfaces thereof to become sticky and self-adhering,
  (c) causing said wetted particles to collide randomly such that the majority of said particles adhere to others of said particles to form aggregates having the same flavor and baking characteristics as the original flour particles.

2. The process of claim 1 wherein the total moisture of said flour particles is reduced during the predrying step to a level sufficiently lower than the equilibrium moisture content of said particles at the given relative humidity and temperature to cause moisture in an amount equal to at least 2% of the dry weight of said particles to be diffused from said atmosphere to said particles during said wetting step.

3. The process of claim 1 wherein the total moisture content of said particles on a dry weight basis is reduced during the predrying step to a level at least 2% below the equilibrium moisture content of said particles at the given relative humidity and temperature.

4. The process of claim 1 wherein the aggregates are dried to a desired moisture level.

References Cited

UNITED STATES PATENTS 3,248,228   4/1966   Gidlow et al. _____ 99—93

FOREIGN PATENTS 207,742   4/1957   Australia.
644,621   7/1962   Canada.

MAURICE W. GREENSTEIN, *Primary Examiner.*